E. A. WILSON & E. L. CRANDALL.
HAND BRAKE FOR TRUCKS.
APPLICATION FILED JUNE 14, 1913.

1,120,581.

Patented Dec. 8, 1914.
2 SHEETS—SHEET 1.

Witnesses
S. Brashear

Inventors
E. A. Wilson and
E. L. Crandall
By W. J. FitzGerald
Attorney

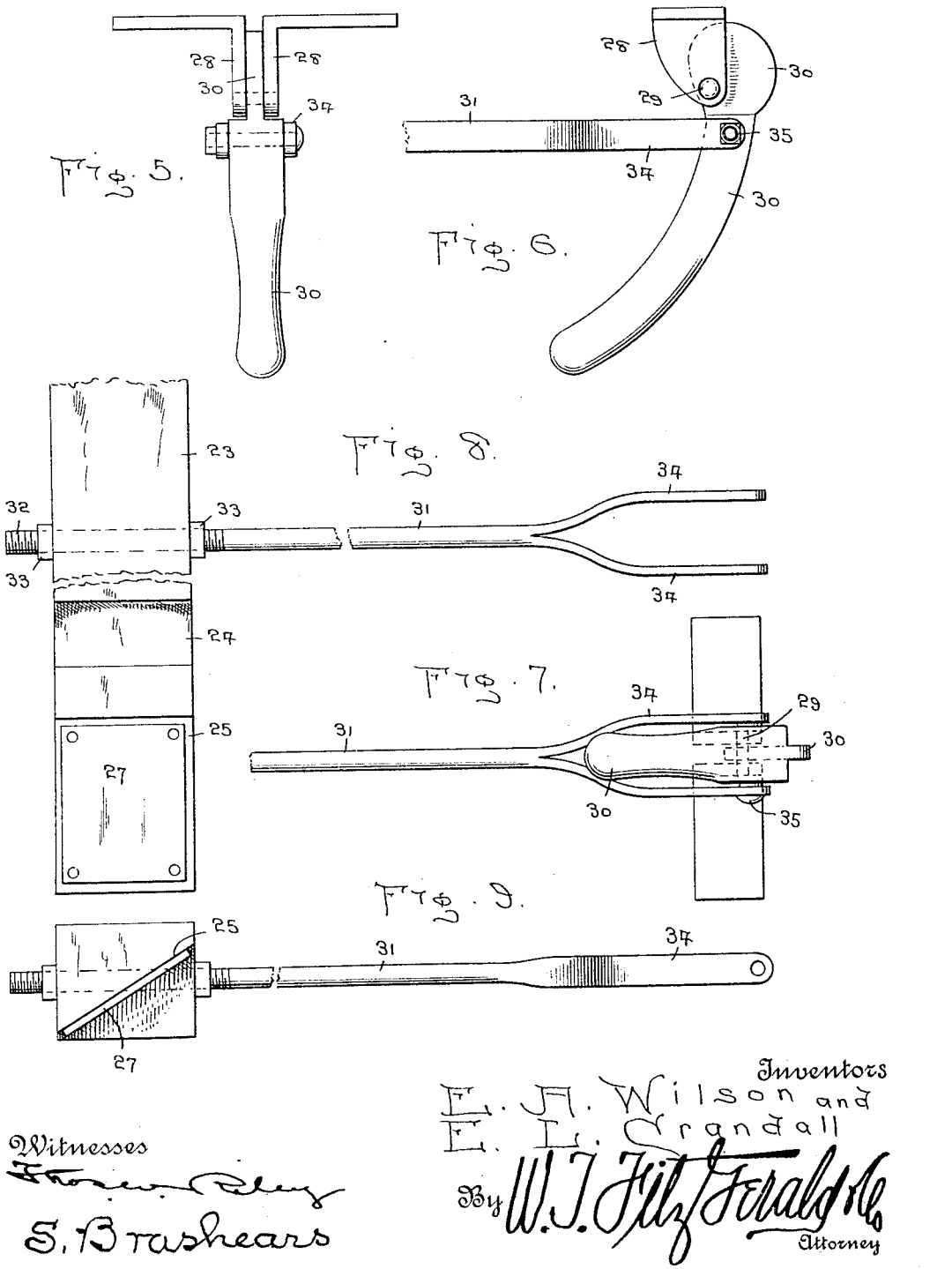

UNITED STATES PATENT OFFICE.

EDGAR A. WILSON AND EUGENE L. CRANDALL, OF CARLISLE, ARKANSAS.

HAND-BRAKE FOR TRUCKS.

1,120,581.  Specification of Letters Patent.  Patented Dec. 8, 1914.

Application filed June 14, 1913. Serial No. 773,689.

*To all whom it may concern:*

Be it known that we, EDGAR A. WILSON and EUGENE L. CRANDALL, citizens of the United States, residing at Carlisle, in the county of Lonoke and State of Arkansas, have invented certain new and useful Improvements in Hand-Brakes for Trucks; and we do hereby declare the following to be a full, clear, and exact description of the invention, such as will enable others skilled in the art to which it appertains to make and use the same.

This invention is in the nature of a hand brake for trucks, and particularly for that class known as warehouse trucks.

The object of the invention is to provide a hand brake for such trucks which shall be extremely simple and economical in construction, easily applied to or removed from the truck, strong, durable, and not at all liable to breakage or disarrangement of the parts in ordinary use.

With this object in view, the invention consists in the improved construction, arrangement and combination of parts adapted to be attached to an ordinary truck to constitute a hand brake mechanism therefor, which will be hereinafter more fully described and afterward specifically claimed.

Figure 1:
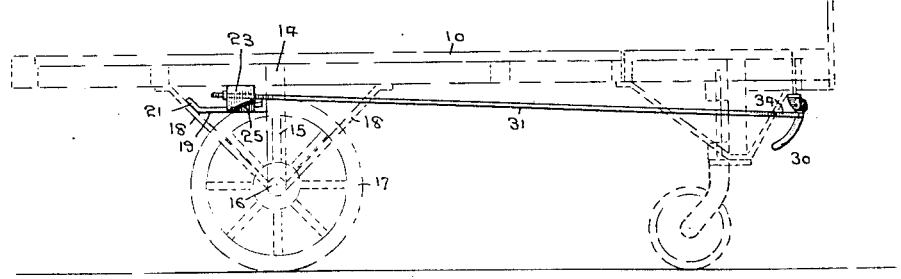
Figure 2:
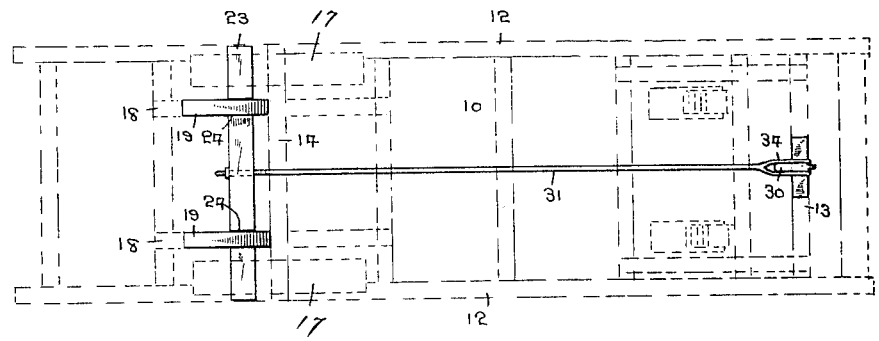
Figure 3:
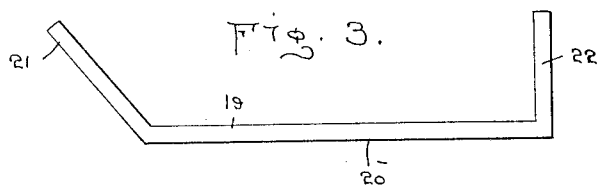
Figure 4:
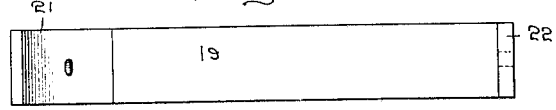

In order that the construction and operation thereof may be readily comprehended, we will now proceed to fully describe our invention in connection with the accompanying drawings, which illustrate an approved embodiment thereof, and in which drawings, Figure 1 represents in dotted outline, an ordinary warehouse truck of any well known type, illustrating, in side elevation, in full lines, the parts comprised in our invention. Fig. 2 represents the same parts in bottom plan view, the truck being also in dotted outline and the invention parts in full lines. Fig. 3 represents a view in side elevation, of one of the supporting plates for the brake bar, detached. Fig. 4 represents the same in plan view. Fig. 5 represents in end elevation, the actuating handle with its supporting brackets and connecting link bars. Fig. 6 represents the same in side elevation. Fig. 7 represents the same in bottom plan view. Fig. 8 represents in bottom plan view, part of the brake beam and the connecting operating link bar, the latter being broken away at one end and having an intermediate portion broken out. Fig. 9 represents an end view of the parts illustrated in Fig. 8 and showing in detail the wedge shape brake shoe.

Like reference characters mark the same parts in all of the figures of the drawings.

Referring specifically to the dotted outlines in Figs. 1 and 2, 10 indicates the top, 11 the operating handle, 12 the side beams, 13 a cross beam near the forward end, 14 another cross beam from which depend brackets or bolster attachments 15 for the rear axle 16, upon which are mounted the ordinary wheels 17, the depending brackets being stiffened by braces 18. All of these parts are of any ordinary and well known construction and form no part of this invention.

At 19 is illustrated a pair of supporting bars or plates which consist of horizontal central or body portions 20, upwardly and outwardly inclined rear ends 21 and forward ends 22 at right angles to the bodies. One of these supporting bars or plates is secured in position adjacent to the sides of the truck and longitudinally thereof, by bolting or otherwise securing the upwardly inclined ends 21 upon one of the braces 18 and the vertical end 22 upon the bolster 15, which will bring the body portion 20 into position below and parallel with the floor of the truck.

At 23 is indicated a brake beam which rests upon the supporting bars or plates 19, transversely of said plates and of the truck, and provided with notches 24 in its under face to straddle the bars or plates 19 and having the lower portions of its outer ends cut away on a diagonal line, as at 25. These portions of the ends of the brake beam rest directly over the wheels 17, shoes 27, of suitable metal (Figs. 8 and 9), being secured upon the rearwardly and upwardly inclined surfaces 25.

Depending below the forward portion of the truck and secured to the cross beam 13, are bearing brackets 28 in which is pivotally mounted, on a pin 29, a handle lever 30 which in its normal position depends as shown in Figs. 1 and 6. A connecting link bar 31 has its rear threaded end 32 passed horizontally through the brake beam 23 and is adjustably secured therein by nuts or other suitable means, the forward end of said operating link bar 31 being bifurcated, and the branches 34 straddle the handle lever 30 and are pivotally connected thereto by means of a pin 35 at a point, (when the handle lever is in its normal position), below the pivot 29 of the hand lever.

When the brake beam is in its normal position it rests upon the bars or plates 19 just far enough rearward to have the inclined shoes 27 clear the wheels 17.

When it is desired to apply the brake, the handle lever, which it will be observed is located in a handy position for the operator of the truck, will be drawn forward at its lower end. This, through the connecting link bar 31 will draw the brake beam on the bars or plates 19, forward, the brake shoes 27 contacting with a wedge action, upon the upper surface of the tires of the wheels. During the first part of the movement of the handle lever 30, when the resistance of the brake bar to its forward movement is least, the pull on the connecting link bar 31 is direct in the direction of the line of the pull on the lever, but as the connecting pin 35, between the link bar 31 and the handle lever 30, moves forward and upward in an arc having the pivotal point 29 for a center, the leverage of the handle gradually increases and the operator is enabled to exert a very strong pull to wedge the shoes 27 against the tops of the wheels. At the end of the movement of the handle lever, the pivotal connecting pin 35 will have moved slightly above the horizontal line of the pivotal pin 29 of the handle lever, which will lock the handle lever in its raised position with the brake shoes wedged into firm contact with the tops of the wheels. In this locked position, the pull backward of the brake shoe on the connecting link bar 31 will be in a line above the pivotal pin 29 of the handle lever and will only tend to more firmly hold the handle lever in its locked position.

To release the brakes, it is only necessary to press downward on the forwardly projecting end of the handle lever which will disengage the brake shoes from the wheels and press them back into their normal positions.

It will be observed that in order to apply our improved hand brake to a truck of ordinary construction, it is only necessary to secure the supporting bars or plates 19 and the depending brackets 28 in position on parts already provided in the ordinary construction of truck. This mounting of the brakes on a truck will consume very little time and it will not be necessary to employ skilled wagon builders to perform the operation. Of course the operation of removing the truck mechanism will be simply the reverse, requiring only the removal of the supporting bars or plates 19 and the brackets 28.

The location and manner of mounting the operating handle lever is especially advantageous. The operator of the truck usually stands at the end, grasping the handle 11. In this position, it is only necessary for him to stoop forward, grasp the handle lever and pull it rearward, the mounting of the handle and the connection thereto of the link bar 19 being such, as hereinbefore described, to greatly multiply the strength of the operator in applying the brake.

While we have specifically described the exact construction and arrangement of the component parts of our invention, it will be obvious to those skilled in the art to which the invention most nearly appertains, that slight changes and variations may be made therein, within reasonable limitations, without departing from the spirit and scope of the invention.

Having thus fully described our invention, what we claim and desire to secure by Letters Patent of the United States is:—

In a brake device for trucks the combination with lever operated means for longitudinal movement of a brake rod, of a brake beam, brackets supporting said brake beam, wedge shaped portions formed integral with the brake beam on the ends thereof, said wedge shaped portions presenting a surface tangential to the periphery of the wheel and reinforcing means adapted to be secured to said wedge shaped portions and interposed therebetween and the rim of the wheel.

In testimony whereof we have signed our names to this specification in the presence of two subscribing witnesses.

EDGAR A. WILSON.
EUGENE L. CRANDALL.

Witnesses:
J. A. HUMPHRIES,
J. A. L. RUFF.

Copies of this patent may be obtained for five cents each, by addressing the "Commissioner of Patents, Washington, D. C."